US012662877B2

(12) United States Patent
Cleland

(10) Patent No.: US 12,662,877 B2
(45) Date of Patent: Jun. 23, 2026

(54) SUSPENSION ASSEMBLIES FOR SUSPENDING CONTAINERS AND METHODS OF USE

(71) Applicant: Tom Cleland, Portage, IN (US)

(72) Inventor: Tom Cleland, Portage, IN (US)

( * ) Notice: Subject to any disclaimer, the term of this patent is extended or adjusted under 35 U.S.C. 154(b) by 0 days.

(21) Appl. No.: 18/633,230

(22) Filed: Apr. 11, 2024

(65) Prior Publication Data

US 2024/0344396 A1 Oct. 17, 2024

Related U.S. Application Data

(60) Provisional application No. 63/495,355, filed on Apr. 11, 2023.

(51) Int. Cl.
*E06C 7/14* (2006.01)

(52) U.S. Cl.
CPC .................................... *E06C 7/14* (2013.01)

(58) Field of Classification Search
CPC .................................. E06C 7/14; E06C 7/143
USPC ................................................ 248/210, 211
See application file for complete search history.

(56) References Cited

U.S. PATENT DOCUMENTS 742,417 A * 10/1903 Hammarstrom ........ E06C 7/146 24/598.5
2,522,658 A * 9/1950 Williams ................ E06C 7/146 248/303
2,993,672 A * 7/1961 Bower ..................... B44D 3/14 248/312.1
3,163,389 A * 12/1964 Thornburgh .............. E06C 7/14 248/211
4,491,293 A * 1/1985 Tibbs ....................... B44D 3/14 248/211
4,658,455 A * 4/1987 Skillern .................... E06C 7/14 7/105
4,676,468 A 6/1987 Preston et al.
4,765,472 A 8/1988 Dent
4,967,436 A * 11/1990 Russell ..................... B67B 7/44 7/164
5,226,623 A * 7/1993 Hunt ......................... E06C 7/14 248/211
5,228,159 A * 7/1993 Gurka ....................... B25F 1/00 7/105
5,421,428 A * 6/1995 Ingles ....................... E06C 7/14 182/230
5,716,034 A * 2/1998 Unkefer .................... E06C 7/14 248/214
5,797,571 A 8/1998 Brophy
(Continued)

*Primary Examiner* — Kimberly T Wood
(74) *Attorney, Agent, or Firm* — Hartman Global IP Law; Gary M. Hartman; Domenica N.S. Hartman

(57) ABSTRACT

Suspension methods and assemblies for suspending a container in a manner that places the container in a convenient location to a user, such as on a ladder, and is safe to use in a workplace environment. Such a suspension assembly includes a suspension unit that has an upper portion, a lower portion, and a central portion therebetween. The central portion has a first channel closer to the upper portion than to the lower portion. The first channel faces downward and is configured to receive a load-bearing member through an opening in the central portion. Clasps are disposed on the lower portion for receiving and securing a portion of the container to thereby suspend the container from the suspension unit.

11 Claims, 10 Drawing Sheets

(56) References Cited

U.S. PATENT DOCUMENTS

| | | | | |
|---|---|---|---|---|
| 5,971,101 | A | 10/1999 | Taggart | |
| 6,585,204 | B1 * | 7/2003 | Haertzen | E06C 7/14 248/211 |
| 6,848,540 | B2 * | 2/2005 | Kvam | E06C 7/14 248/211 |
| 7,887,016 | B2 | 2/2011 | Gunsaullus | |
| 10,405,624 | B2 | 9/2019 | Brouard | |
| 10,434,637 | B2 | 10/2019 | Sites | |
| 10,731,415 | B2 * | 8/2020 | Desjardine | E06C 7/14 |
| 2015/0285001 | A1 * | 10/2015 | Bardill | E06C 7/14 248/211 |

* cited by examiner

SUSPENSION ASSEMBLIES FOR SUSPENDING CONTAINERS AND METHODS OF USE

CROSS-REFERENCE TO RELATED APPLICATIONS

This application claims the benefit of U.S. Provisional Application No. 63/495,355 filed Apr. 11, 2023, the contents of which are incorporated herein by reference.

BACKGROUND OF THE INVENTION

The invention generally relates to tools, maintenance equipment, and their methods of use. The invention particularly relates to assemblies for suspending containers and methods for their use.

Ladders enable users to reach areas that are otherwise vertically out of reach and as such are commonly employed in maintenance and repair work around households and workplaces by both professionals and private users. Ladder designs are well known and therefore will not be described in any detail here. Unless specified otherwise in a particular context, the term "ladder" will be used to refer to rigid self-supporting ladders adapted to be leaned against a structure, including but not limited to a wall of a building, and to step ladders that are also rigid and self-supporting but equipped with hinges to form an inverted V and adapted to support itself on a surface of a structure, including but not limited to a building floor or ground, and to nonrigid ladders adapted to be suspended from a structure, including but not limited to a beam or frame of a building.

Often when performing tasks that require the use of a ladder, specific tools or materials are also required. For instance, when painting the side of a house, a ladder may be employed to reach elevations that are not otherwise accessible. In addition to the ladder, an individual must also carry at least a paint applicator (a brush or roller) and a container of paint while scaling the ladder. If possible, the user may choose to scale the ladder with the paint applicator and container, thereby reducing the number of ascents and descents required, saving time and energy, and reducing the overall risk of injury. However, scaling a ladder with a paint container may present problems and risks that outweigh the benefits of efficiency. Ladders may lack a sufficiently large, flat, and level surface capable of accommodating and supporting a paint applicator and container. In some instances, such a support surface is largely limited to flat steps of the ladder or a hinged platform near the top of a step ladder. Additionally, accessing an item on such a support surface may be difficult or uncomfortable to a user, as well as present a potential safety hazard. Finally, a large or unwieldy object placed on a limited flat support surface can be rather precarious, susceptible to being knocked off by a user when moving or reaching for the object, and stabilized by its own weight rather than a more effective and reliable mechanism. All of these concerns are magnified by any instability in the emplacement of the ladder, as well as the naturally jittery tendencies of users who may be uncomfortable with operating at some height off the ground.

The problems described above are not specific to painting alone. Rather, any user conducting work on a ladder that requires tools, equipment, or materials that cannot be simultaneously carried or utilized while scaling and being supported by a ladder is faced with a similar predicament. For instance, an individual may be conducting repairs that require multiple handheld tools, compelling the user to carry a tool bag or bucket with them to reduce the number of trips up and down the ladder, save time and energy, etc.

In light of the above, it would be desirable to enable the user of a ladder to secure an object, such as a container, tool, tool bag, etc., to the ladder without relying on the ladder being equipped with a large flat support surface, and so that the object is easily accessible to a user while also being naturally stable and not susceptible to being accidentally knocked of the ladder.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, suspension methods and assemblies for suspending a container in a manner that places the container in a convenient location to a user, such as on a ladder, and is safe to use in a workplace environment.

According to a nonlimiting aspect of the invention, a suspension assembly includes a suspension unit that has an upper portion, a lower portion, and a central portion therebetween. The central portion has a first channel closer to the upper portion than to the lower portion. The first channel faces downward and is configured to receive a load-bearing member through an opening in the central portion. Clasps are disposed on the lower portion for receiving and securing a portion of the container to thereby suspend the container from the suspension unit.

According to another nonlimiting aspect of the invention, a method of using a suspension assembly as described above includes securing the container to the suspension unit with the clasps, inserting the load-bearing member through the opening of the central portion, and positioning the load-bearing member within the first channel of the central portion such that the container is suspended from the load-bearing member.

These and other aspects, arrangements, features, and/or technical effects will become apparent upon detailed inspection of the figures and the following description.

DETAILED DESCRIPTION OF THE INVENTION

Figure 1:
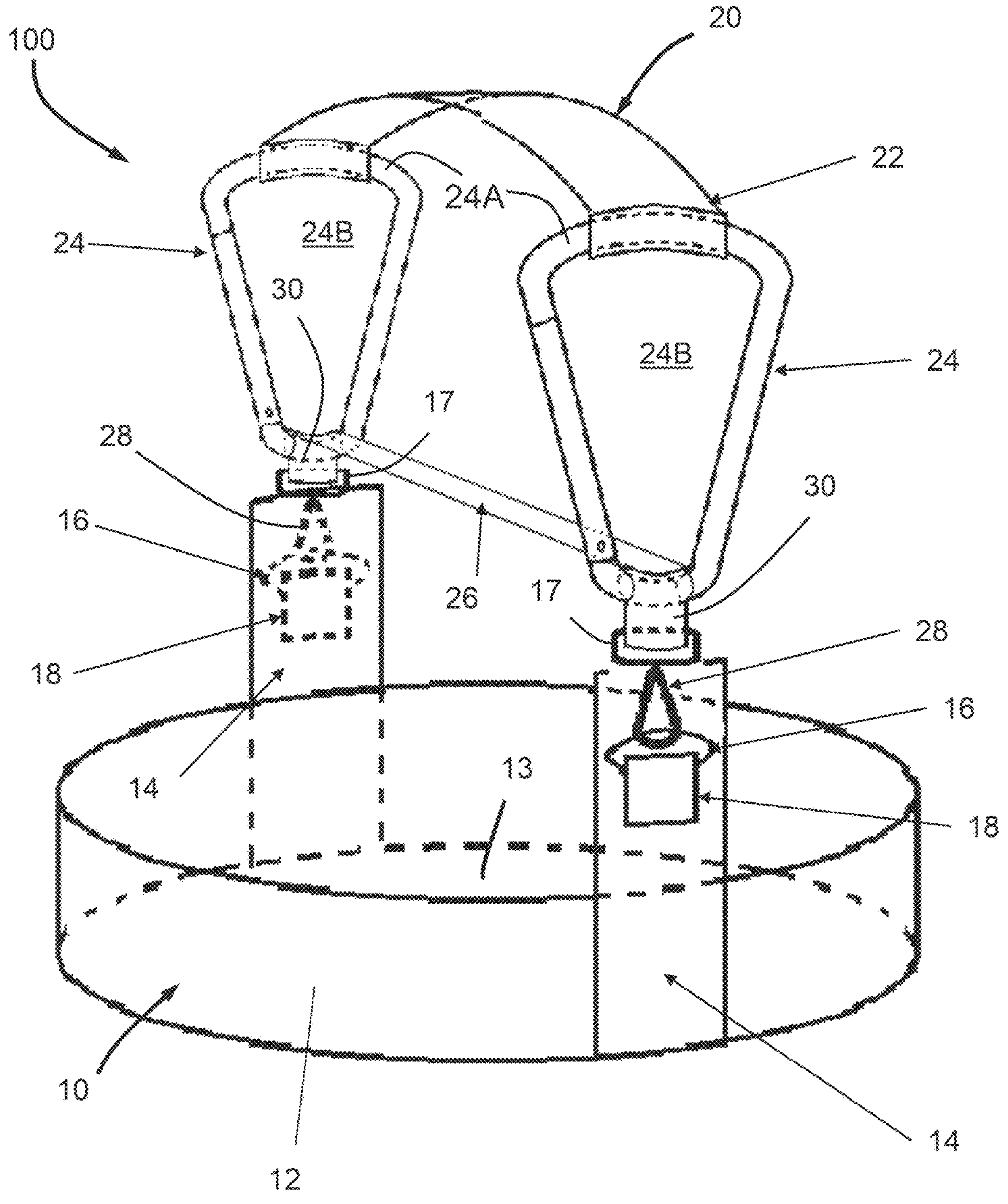
FIG. 1 is a perspective representation of a flexible suspension assembly that comprises a flexible belt and a flexible suspension unit in accordance with a nonlimiting embodiment of the present invention.

The intended purpose of the following detailed description of the invention and the phraseology and terminology employed therein is to describe what is shown in the drawings, which depict and/or relate to one or more nonlimiting embodiments of the invention, and to describe certain but not all aspects of the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter intended to be aspects of the invention, including certain but not necessarily all of the aspects and alternatives described in the detailed description.

To facilitate the description provided below of the embodiment(s) represented in the drawings, relative terms, including but not limited to, "proximal," "distal," "anterior," "posterior," "vertical," "horizontal," "lateral," "front," "rear," "side," "forward," "rearward," "top," "bottom," "upper," "lower," "above," "below," "right," "left," etc., may be used in reference to the orientation of suspension assemblies during their use as represented in the drawings. Additionally, terms such as "bucket," "clip," "carabiner," "ladder," and other terms denoting specific items or pieces of equipment are used as descriptors of certain components capable of being utilized with the invention, but should be considered nonlimiting insofar as the same or similar functions can be performed with other components.

According to nonlimiting aspects of the present invention, suspension assemblies 100 are provided which allow a container 40 (such as a bucket or other receptacle) to be suspended from a rigid or nonrigid load-bearing member, for example, a step or rung of a ladder (FIGS. 4 and 10), thereby facilitating case of access to the container 40. The suspension assembly 100 comprises a belt 10 and a suspension unit 20. The belt 10 provides a means by which a container is secured within or to the belt 10, and the suspension unit 20 provides means for affixing the suspension unit 20 to the load-bearing member. Both the belt 10 and the suspension unit 20 provide means of coupling one to the other. In the drawings, such coupling means are represented as coupling assemblies that comprise such components as rings 16 and 17, and clasps 28 which in combination enable the belt 10 to be coupled to and suspended from the suspension unit 20.

FIGS. 1 through 4 represent a first nonlimiting embodiment of the invention. FIG. 1 depicts the suspension assembly 100 as comprising the belt 10 that includes a circular strap 12 and at least two vertical straps 14, each equipped with a loop 18 coupled to a corresponding one of the rings 16 such that the loops 18 couple the vertical straps 14 to the rings 16. The vertical straps 14 are equidistant from each other along the circumference of the circular strap 12 so that the belt 10 is balanced and symmetrical. The vertical straps 14 extend upwards from the circular strap 12. The loops 18 are represented as permanently affixing the rings 16 to the vertical straps 14. As used herein, an arrangement is referred to as "permanent" if disassembly would require cutting a component of the arrangement to remove the component from the arrangement.

Figure 4:
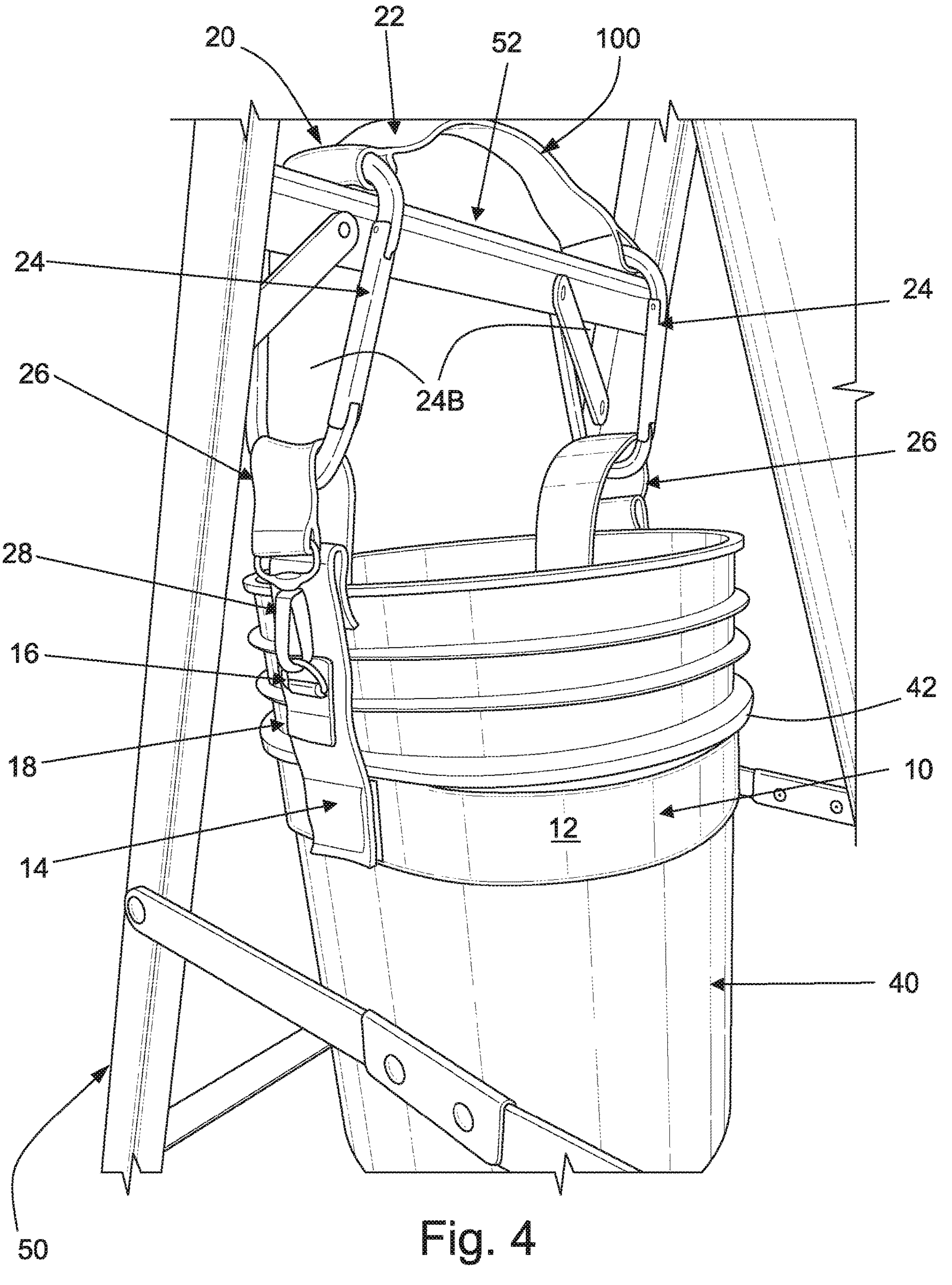
FIG. 4 is a perspective view representing a nonlimiting mode of using the suspension assembly of FIG. 1.

The circular strap 12 of the belt 10 defines a central opening 13 sized to surround and engage the exterior (e.g., circumference) of the container 40 (such as a bucket shown in FIG. 4). The belt 10 and its circular strap 12 are not rigid, but instead are each flexible in order to conform to the exterior shape of the container 40. The strap 12 may have limited elasticity such that the circumference of the strap 12 does not significantly expand when a container 40 of considerable weight is received in the opening 13 and gripped by the strap 12, with the result that the container 40 can be secured within the circumference of the circular strap 12. In the case of a container 40 having a tapered exterior, the circular strap 12 engages the container 40 by inserting the bottom of the container 40, where it is narrowest, through the opening 13 of the circular strap 12. The circular strap 12 is then pulled up towards the top of the container 40. As the circumference of the container 40 increases closer to the top of the container 40, the circular strap 12 is gradually secured against the exterior of the container 40 to the point that the circular strap 12 cannot slide any farther up the container 40. The cross-section of the circular strap 12 is represented in the drawings as roughly flat, thereby maximizing the surface area of the strap 12 that contacts the container 40 to which it is engaged. Movement of the circular strap 12 relative to the container 40 may also be arrested and secured by lips, ridges, or ribs 42 (see FIG. 4) that are commonly found on containers such as paint and utility buckets. In this manner, when the belt 10 is suspended by its vertical straps 14 and rings 16, the weight of the container 40, especially when laden, pushes it down against the circular strap 12, thereby firmly securing it within the belt 10.

The vertical straps 14 of the belt 10 may be affixed to the circular strap 12 by means of sewing, looping, pinning, or other fastening means known to those skilled in the art, provided the fastening means are of sufficient strength to support the weight of the container 40 and belt 10 once suspended. The vertical straps 14 may furthermore be manufactured with the circular strap 12 as one contiguous component of the belt 10.

Figure 2:
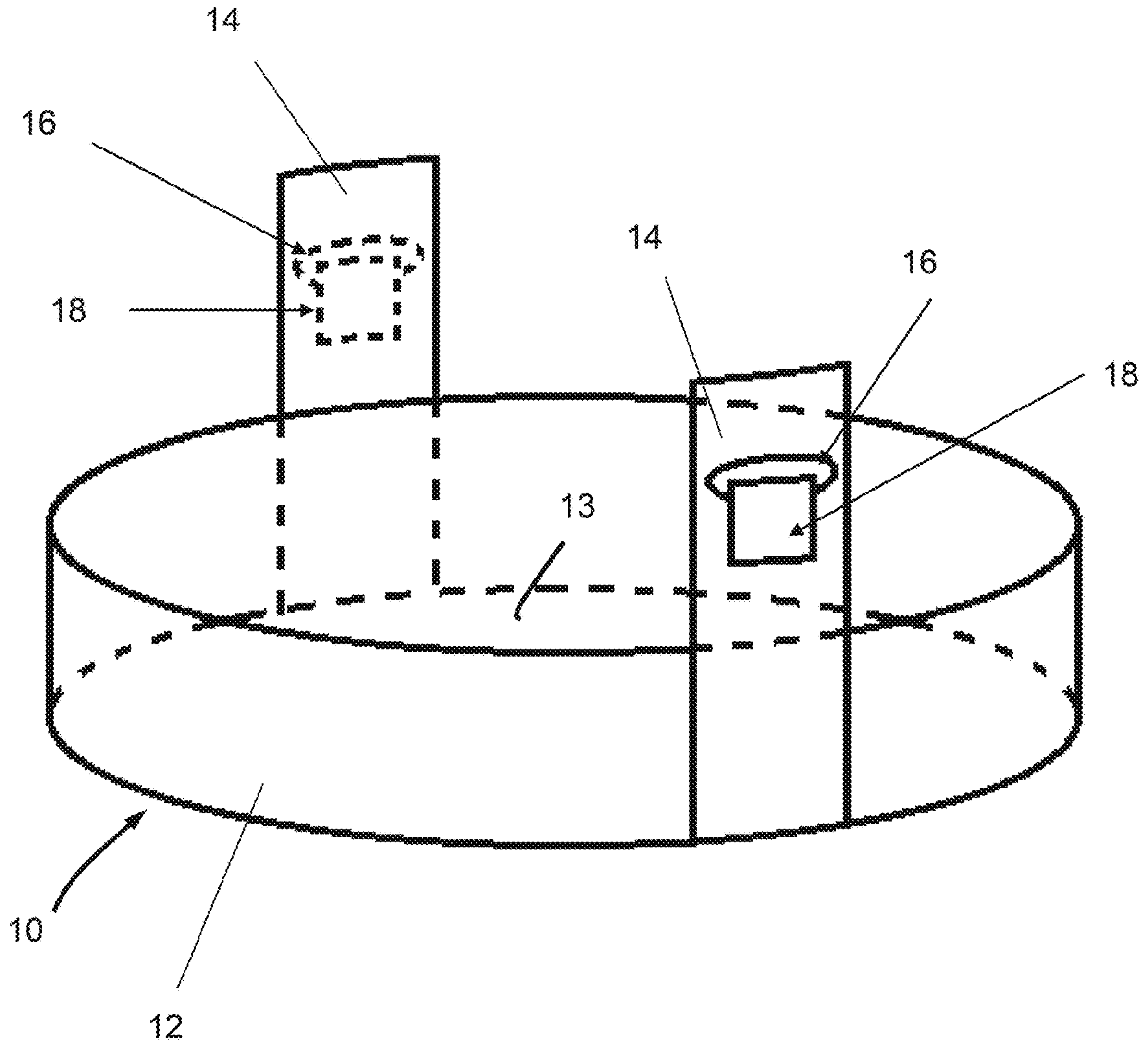
FIG. 2 is a perspective representation of the belt of FIG. 1.
Figure 3:
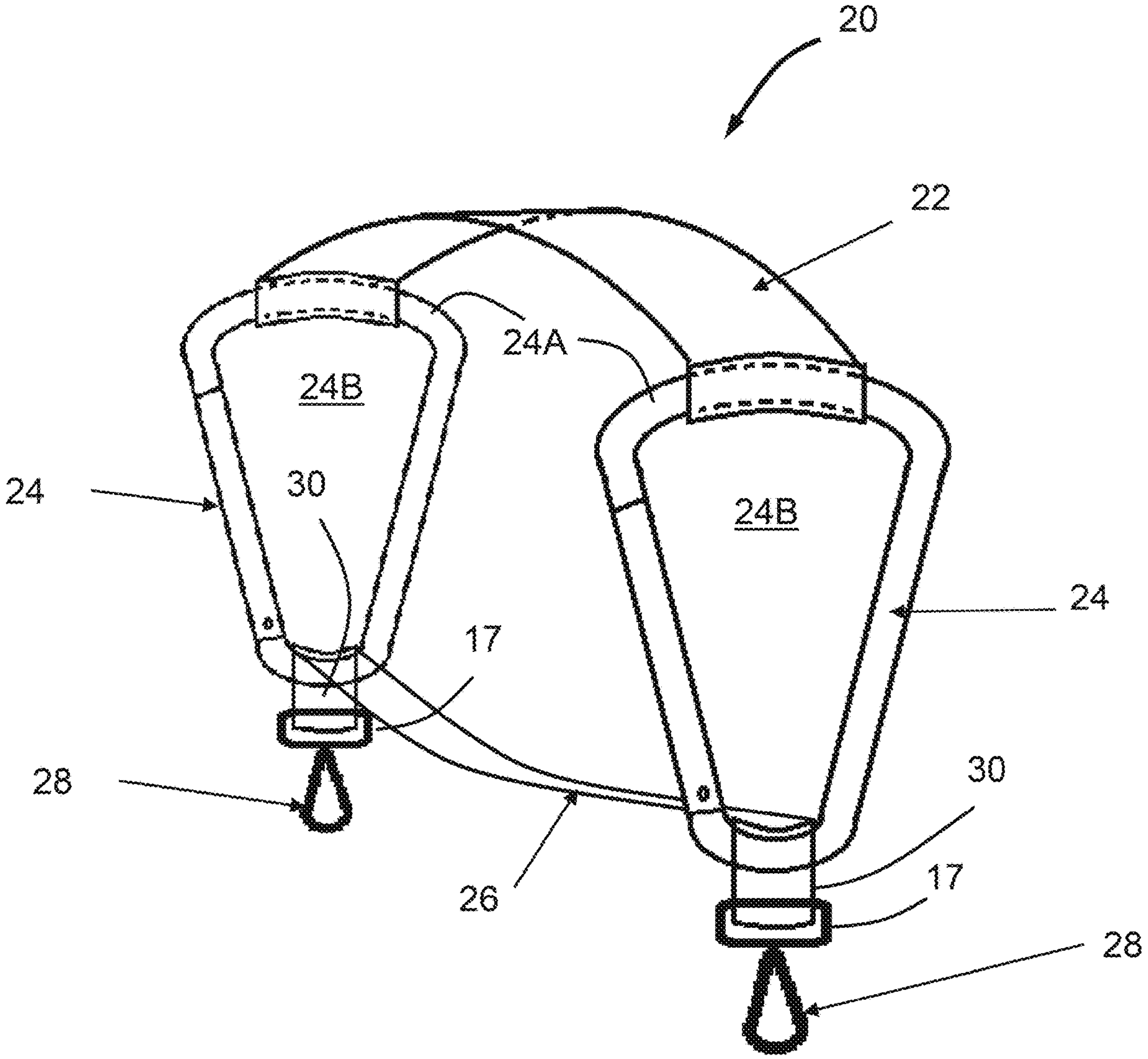
FIG. 3 is a perspective representation of the suspension unit (strap) of FIG. 1.

In the nonlimiting embodiment of FIGS. 1 through 4, the suspension unit 20 comprises an upper strap 22, a lower strap 26, a pair of carabiners 24, and a pair of loops 30 securing the carabiners 24 to the aforementioned rings 17 of the coupling assembly. The carabiners 24 are shown as permanently affixed at their upper ends (defined by upper members 24A) to opposite ends of the upper strap 22 and permanently affixed at their lower ends to opposite ends of the lower strap 26 adjacent the loops 30. The rings 16 and 17 of the belt 10 and suspension unit 20 are releasably coupled together with the clasps 28 to secure the belt 10 to the suspension unit 20, enabling the belt 10 to hang from and beneath the suspension unit 20. The upper and lower straps 22 and 26 limit the spacing of the carabiners 24 relative to each other, and preferably are the same or approximately the same length. The maximum distance between the carabiners 24 allowed by the straps 22 and 26 is preferably at least equal to the diameter of the circular strap 12 when the container 40 is received in its opening 13. In the embodiment of FIGS. 1, 3, and 4, the straps 22 are both flexible, enabling the suspension unit 20 to be assemblable and suspend containers 40 of different diameters and sizes.

FIGS. 1 and 4 illustrate the rings 16 and 17 of the belt 10 and suspension unit 20 coupled together with the clasps 28 to yield the suspension assembly 100. The rings 16 of the belt 10 are affixed to the vertical straps 14 and are engaged by the clasps 28 of the suspension unit 20. The rings 17 of the suspension unit 20 are represented as D-rings, with at least their upper expanses substantially linear to promote stability when received in the loops 30. The clasps 28 may be permanently affixed at midpoints to the lower expanses of the D-rings 17.

In view of the above, it can be appreciated that, aside from the rings 17, carabiners 23, and clasps 28, the suspension unit 20 can be and is preferably flexible, similar to the belt 10.

FIG. 4 illustrates a nonlimiting example of the use of the suspension assembly 100 of FIGS. 1 through 3. The circular strap 12 of the belt 10 is shown secured around and against the exterior circumference of the container 40, and the upward motion of the strap 12 relative to the container 40 is arrested by both the increasing circumference of the container 40 and the rib 42 of the container 40. The vertical straps 14 extend upward from the circular strap 12 along the surface of the container 40, further stabilizing the container 40, although such an arrangement is not necessarily required for every potential use of the assembly 100. The rings 16 are affixed to the vertical straps 14 with the fabric loops 18 sewn to the vertical straps 14. The upper half of each ring 16 is exposed and engaged by one of the clasps 28 of the suspension unit 20. As shown in FIG. 4, the container 40 is suspended and rests securely within the circular strap 12, which is suspended via the straps 14, loops 18, rings 16, and clasps 28 to the rings 17 and loops 30 attached to the lower ends of the carabiners 24 of the suspension unit 20. In this manner, the assembly 100 suspends the container 40 from the load-bearing member in a manner that is stable, convenient, and efficient. The clasps 28 preferably allow the belt 10 to be selectively separated from the suspension unit 20 by decoupling from the rings 16 attached to the straps 14 of the belt 10. As such, it is possible to provide multiple belts 10 of different sizes to accommodate different types and sizes of containers 40.

In FIG. 4, the carabiners 24 are of sufficient size to receive within their interiors 24B a load-bearing member 52 (in this case, a step 52 of a ladder 50) such that upper members 24A of the carabiners 24 and the upper strap 22 of the suspension unit 20 are disposed above the step 52 and the carabiners 24 physically engage the step 52 to suspend the container 40 from the step 52. Though the use of carabiners 24 is convenient due to the ability to easily pass a step 52 of a ladder 50 through a gate opening otherwise closed by a spring-loaded gate conventionally found on a carabiner, the use of another type of shackle or clip is also within the scope of the invention. Furthermore, carabiners, shackles, clips, etc., having different shapes than that shown are also within the scope of the invention. As evident from FIG. 4, the carabiners 24 are of sufficient dimensions and their upper members 24A are relatively straight and horizontal to enable the carabiners 24 to rest stably on the step 52 of the ladder 50.

The upper and lower straps 22 and 26 provide additional stability to the suspension unit 20 by limiting the range of motion of the carabiners 24 relative to each other. Additionally, the upper strap 22 provides a convenient means for lifting, transporting, and placing the suspension assembly 100.

The straps 12, 14, 22 and 26 and loops 18 and 30 can be manufactured from a nylon material, though other materials are foreseeable. These and other components of the assembly 100 should be formed of materials that are sufficiently strong to bear the weight of the assembly 100, the container 40, and whatever items or materials are intended to be placed in the container 40, and also sufficiently inelastic to ensure that the range of motion of the assembly 100 is limited to promote stability. The upper strap 22 also has utility as a means for carrying the assembly 100 and the container 40 attached thereto, enabling a user to scale the ladder 50 while holding the entire assembly 100 will one hand. Once the assembly 100 is installed on the ladder 50 (e.g., FIG. 4), the container 40 is stably positioned without occupying any space on a step or other flat surface area of the ladder 50, and the user can easily access the contents of the container 40.

The embodiment represented in FIGS. 1 through 4 is nonlimiting, as alterations and modifications within the scope of the present invention may be adopted depending on various factors. For instance, the positions of the clasps 28 and ring 16 may be interchangeable. Additionally, any or all of the straps 12, 14, 22 and 26 and loops 18 and 30 may be configured to have adjustable lengths, allowing the assembly 100 to be reconfigured for a particular or multiple different uses.

Figure 5:
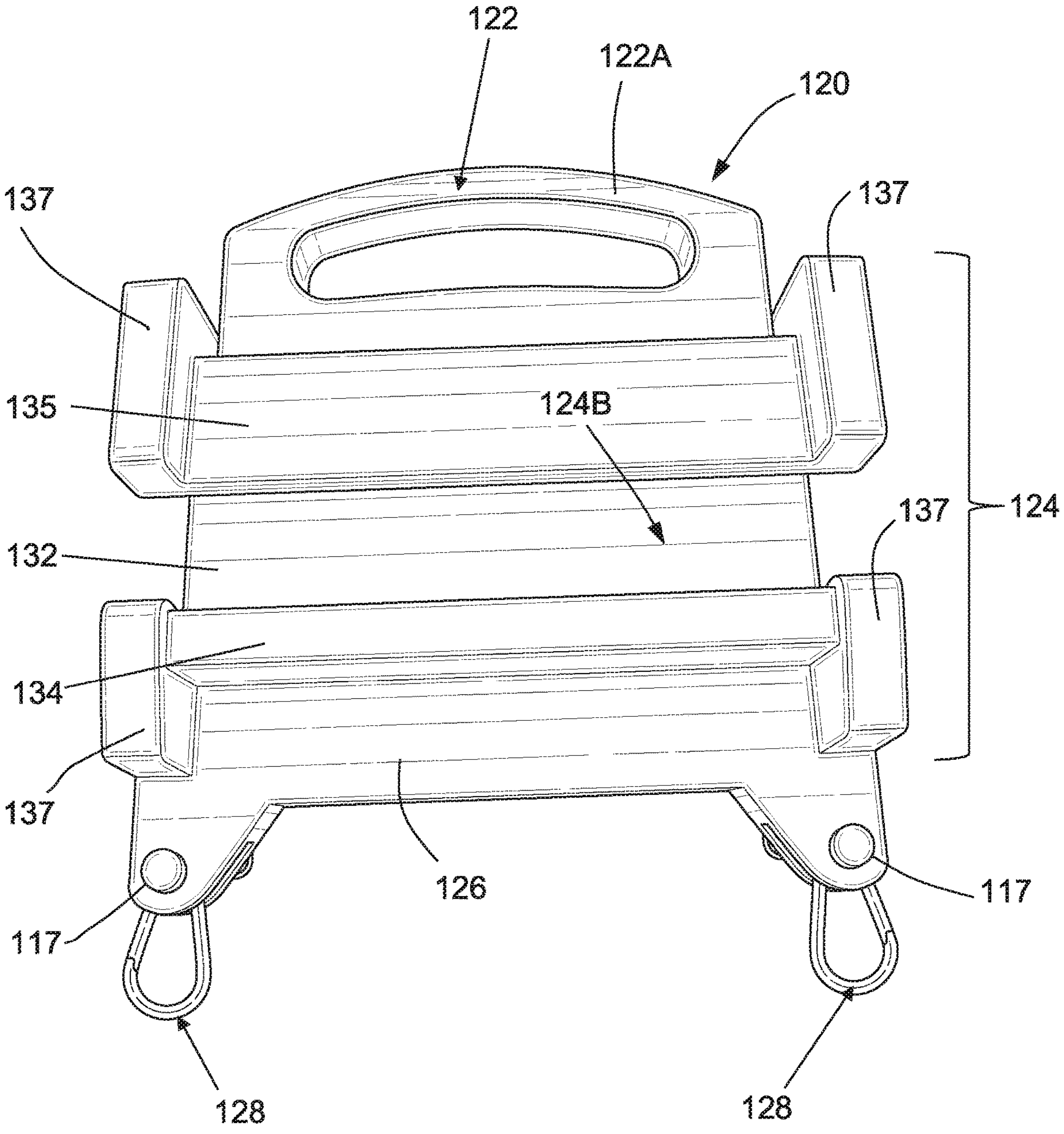
FIG. 5 is a front view of a rigid suspension unit adapted for use with the belt of FIG. 2 in accordance with another nonlimiting embodiment of the present invention.
Figure 6:
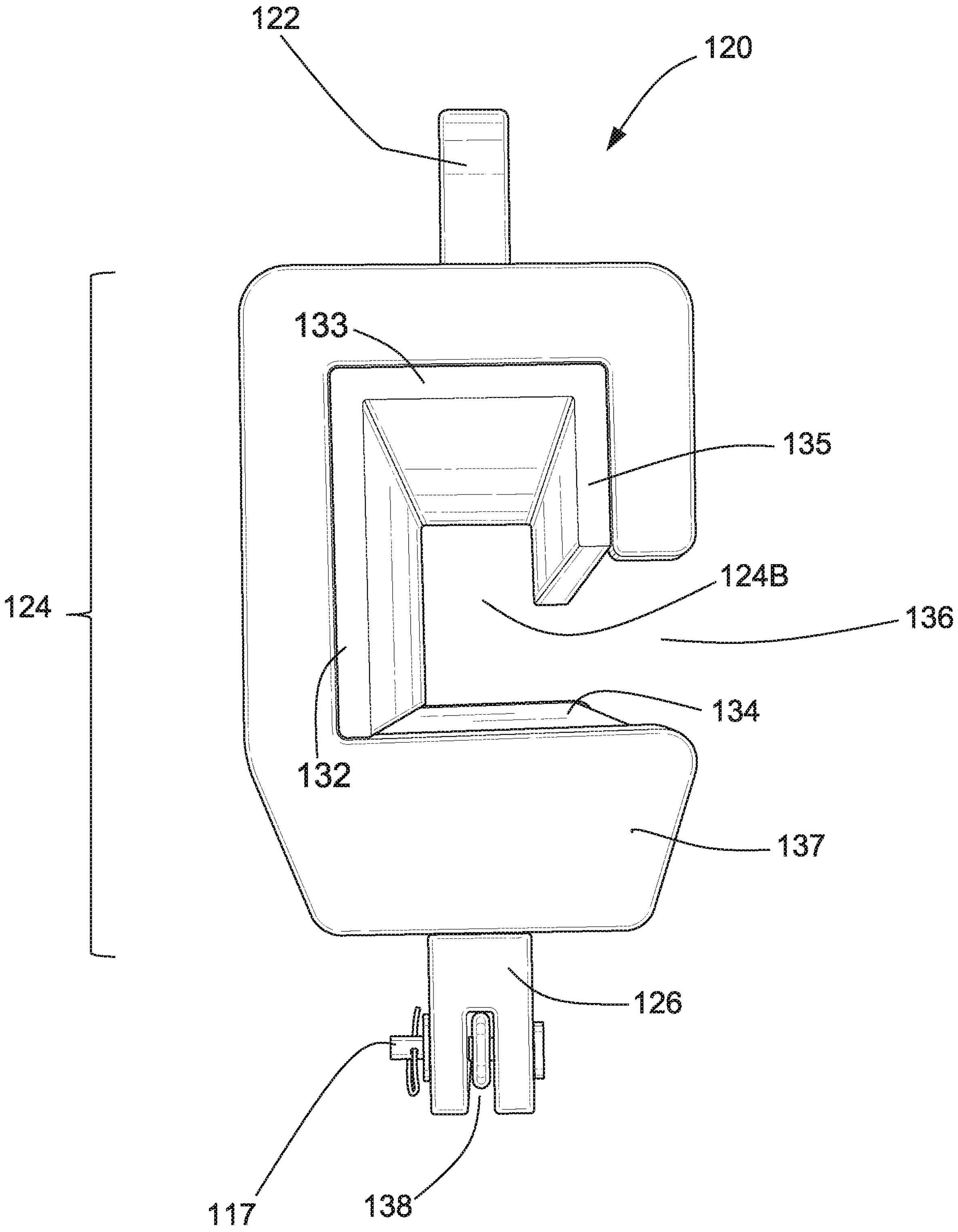
FIG. 6 is a side view of the rigid suspension unit of FIG. 5.
Figure 7:
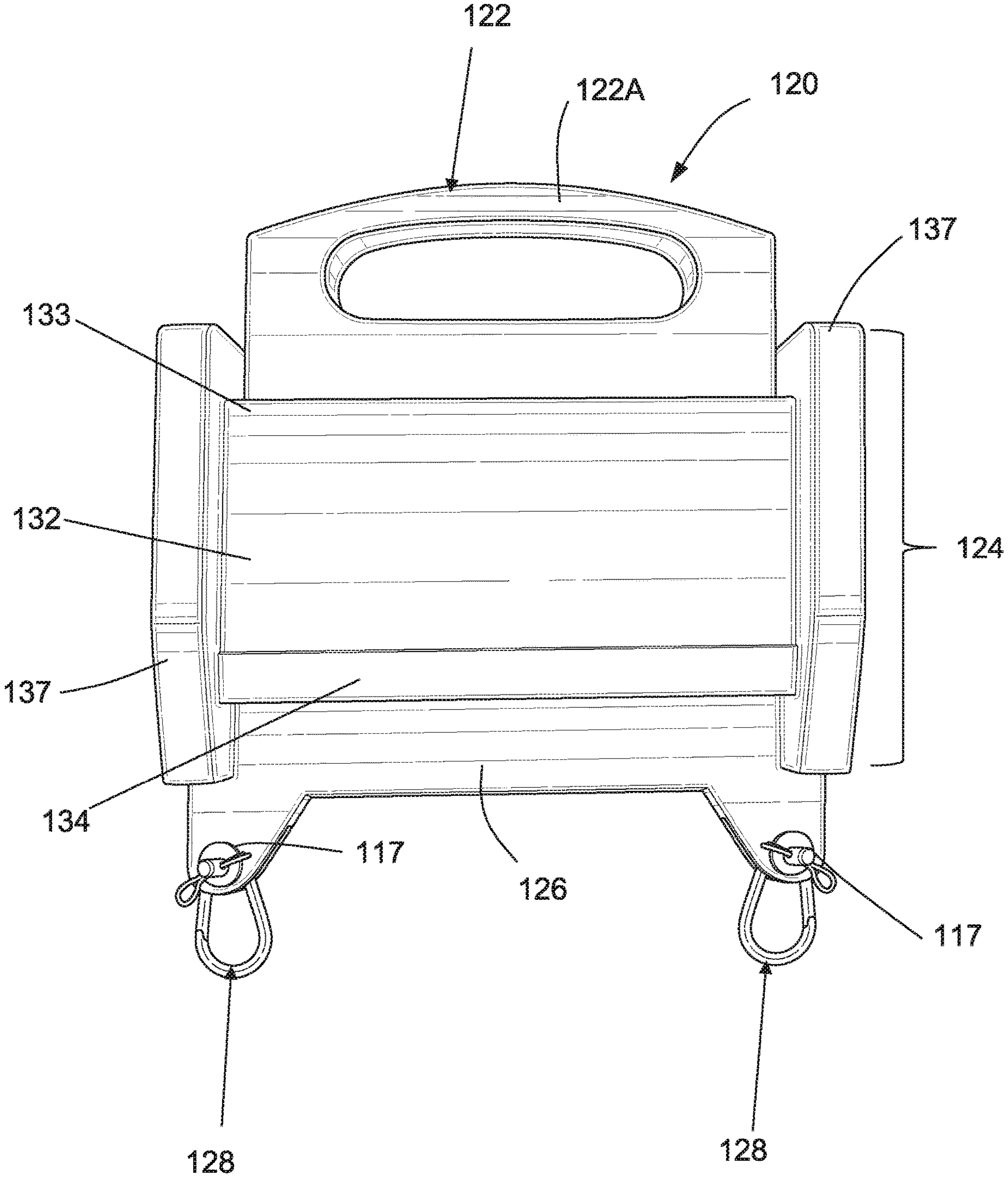
FIG. 7 is a rear view of the rigid suspension unit of FIG. 5.

FIGS. 5 through 7 represent a second nonlimiting embodiment of a suspension unit 120 that can be used in place of the suspension unit 20 depicted with the suspension assembly 100 of FIG. 1. In view of similarities between these embodiments, the following discussion of FIGS. 5 through 7 will focus primarily on aspects of the suspension unit 120 that differ from the suspension unit 20 in some notable or significant manner. Other aspects of the suspension unit 120 not discussed in any detail can be, in terms of structure, function, materials, etc., essentially as was described for the suspension unit 20.

In FIGS. 5 through 7, the suspension unit 120 is not flexible as is the suspension unit 20 of FIG. 1, but instead can be and preferably is rigid, and generally in a form of what may be referred to as a rigid hanger. The suspension unit 120 of FIGS. 5 through 7 includes an upper portion 122 corresponding to the upper strap 22 of the suspension unit 20, a central portion 124 corresponding to the carabiners 24 of the suspension unit 20 and defining a downward-facing horizontal channel 124B corresponding to the interiors 24B of the carabiners 24 of the suspension unit 20, a lower portion 126 corresponding to the lower strap 26 of the suspension unit 20, and clasps 128 corresponding to the clasps 28 of the suspension unit 20 and serving essentially the same purpose as the clasps 28, for example, to couple with the rings 16 of the belt 10 depicted in FIG. 2. In contrast to the suspension unit 20 of FIG. 1, the upper, central, and lower portions 122, 124, and 126 of the suspension unit 120 are each rigid and rigidly adjoin each other, such that the suspension unit 120 as a whole is rigid. The upper portion 122 defines a handle 122A for transporting the suspension unit 120, similar to the capability of the upper strap 22 of the first embodiment. The central portion 124 is preferably disposed between the upper and lower portions 122 and 126.

As more readily evident from FIG. 6, the channel 124B is formed by four wall portions 132, 133, 134, and 135 of the central portion 124, with an opening 136 between two of the wall portions 134 and 135 through which a rigid or nonrigid load-bearing member 52 (for example, a step or rung 52 of the ladder 50 in FIG. 4) is able to pass. The channel 124B is configured in size and shape to accommodate such a load-bearing member 52, thereby providing a similar function as the carabiners 24 of the first embodiment. As shown in FIG. 6, the wall portions 132, 133, 134, and 135 are secured together by two end wall portions 137 of the central portion 124 and form an approximately C-shaped cross section. The opening 136 is opposite one of the wall portions 132, referred to herein as the rear wall portion 132, and is defined by and between the wall portions 134 and 135, referred to hereinafter as the lower and front wall portions 134 and 135, respectively. The front wall portion 135 extends downward from the wall portion 133 referred to herein as the upper wall portion 133. The distance between the front wall portion 135 and the lower wall portion 134 defines the width of the opening 136, and the distance between the front wall portion 135 and the rear wall portion 132 defines the depth of the channel 124B into which a load-bearing member 52 is receivable. The front wall portion 135 inhibits a load-bearing member 52 from escaping the channel 124B, thereby securing the suspension unit 120 to the load-bearing member 52 once placed on the load-bearing member 52 so that the suspension unit 120 securely hangs from and is retained on the load-bearing member 52. The channel 124B is closer to the upper portion 122 than to the lower portion 126 so as to promote the stability of the suspension unit 120 when suspended from a load-bearing member 52 disposed in the channel 124B.

The lower portion 126 extends downward from the central portion 124 and provides means, such as fasteners 117, for securing the clasps 128 to the suspension unit 120. In the embodiment represented in FIGS. 5 through 7, the clasps 128 are secured to the lower portion 126 by being inserted into a slot that is parallel to the plane of the lower portion 126 and secured thereto with the fasteners 117.

As in the previous embodiment of the invention, the clasps 128 can be utilized to engage the rings 16 of the belt 10, thereby allowing the belt 10 to be suspended from the rigid suspension unit 120. The weight of a container 40 secured within the belt 10 pulls the belt 10 downward, causing the central portion 124 and its channel 124B to securely engage a load-bearing member 52 placed in the channel 12B under the force of gravity. Alternatively, the clasps 128 can be utilized to capture a handle of a container 40, thereby omitting the need for the belt 10 and allowing the container 40 to be suspended directly from the suspension unit 120.

Figure 8:
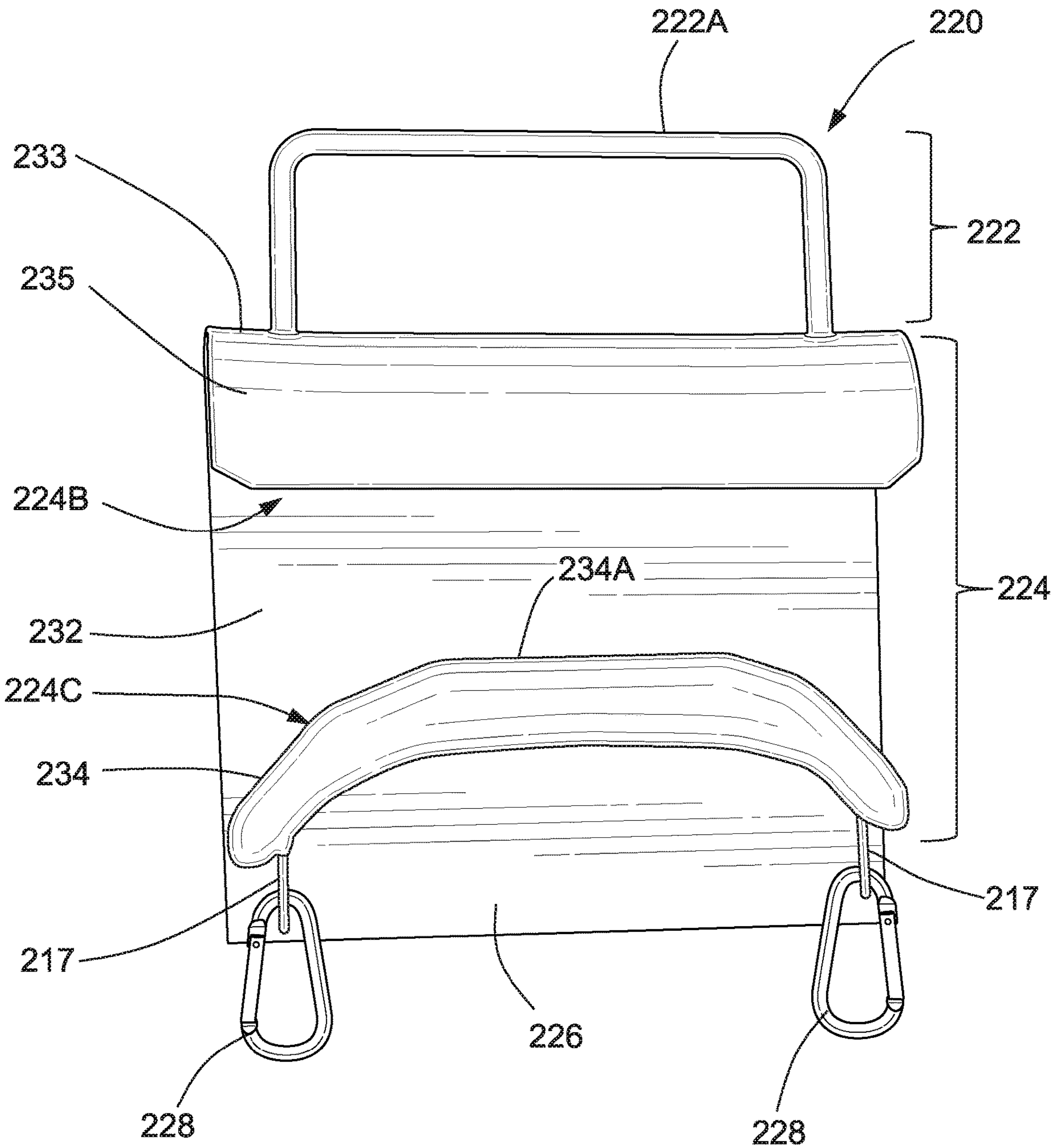
FIG. 8 is a front view of a rigid suspension unit adapted for use with the belt of FIG. 2 in accordance with another nonlimiting embodiment of the present invention.
Figure 9:
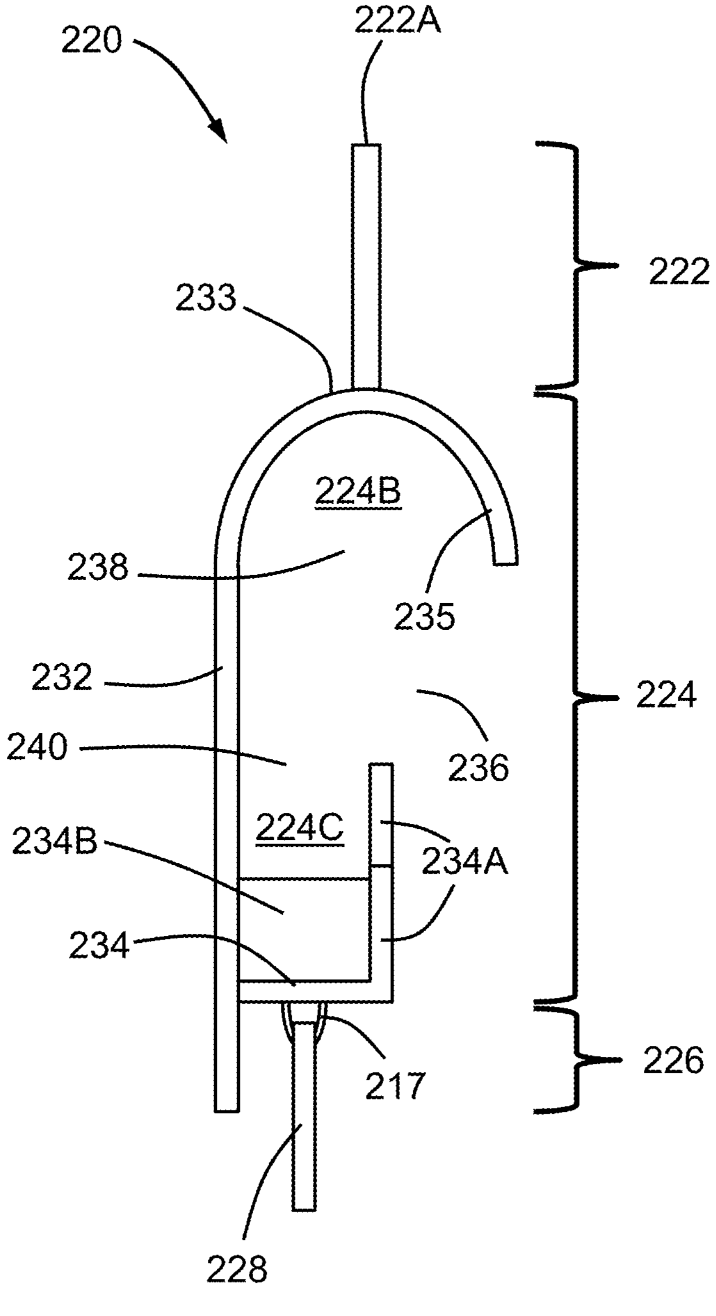
FIG. 9 is a side view of the rigid suspension unit of FIG. 8.
Figure 10:
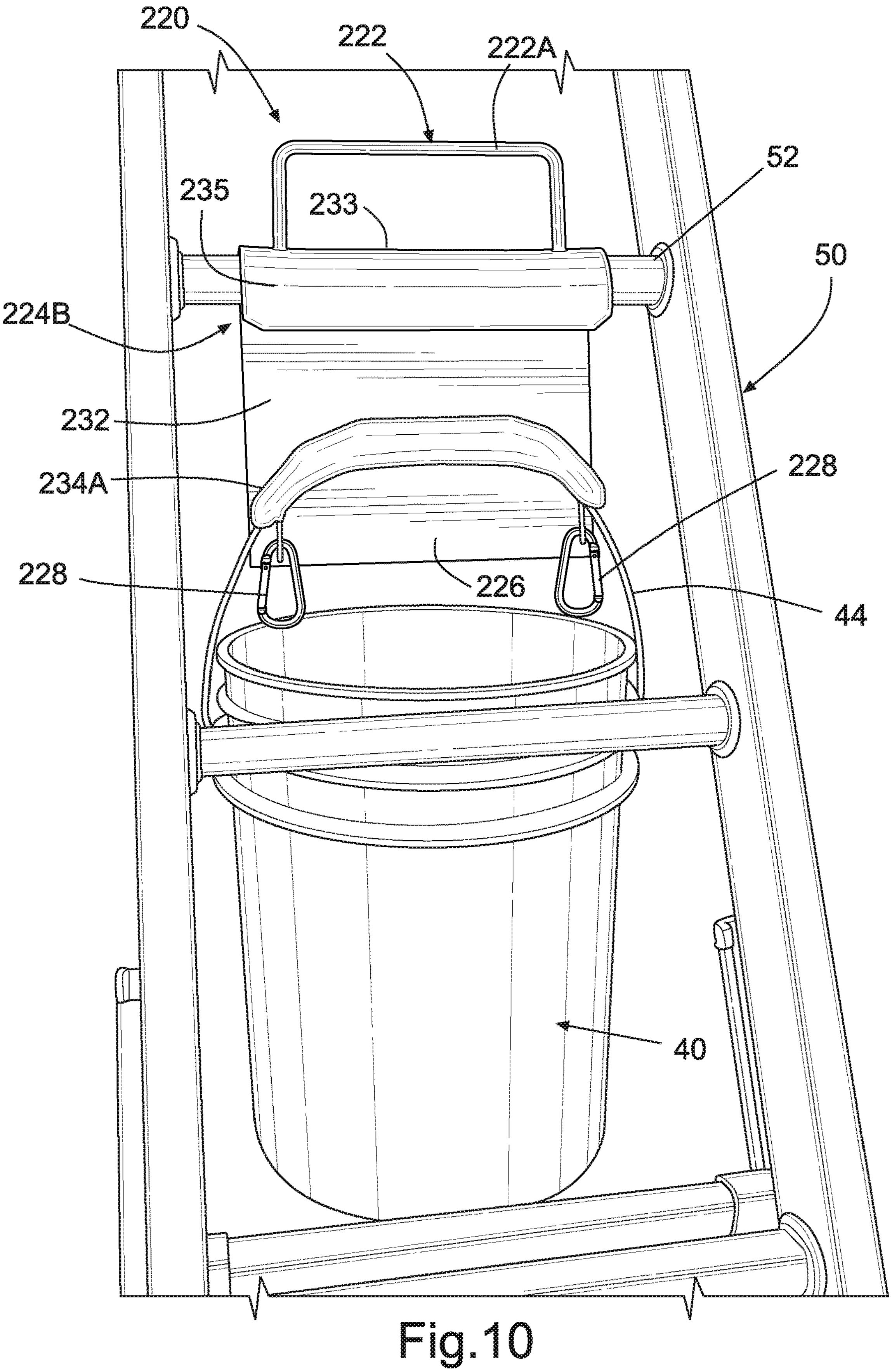
FIG. 10 is a perspective view representing nonlimiting mode of using the suspension assembly of FIG. 8.

FIGS. 8 through 10 represent a third nonlimiting embodiment of a suspension unit 220 that can be used in place of the suspension unit 20 depicted with the suspension assembly 100 of FIG. 1. In view of similarities between the embodiments, the following discussion of FIGS. 8 through 10 will focus primarily on aspects of the suspension unit 220 of FIGS. 8 through 10 that differ from the suspension unit 120 of FIGS. 5 through 7 in some notable or significant manner. Other aspects of the suspension unit 220 not discussed in any detail can be, in terms of structure, function, materials, etc., essentially as was described for the suspension unit 120.

In FIGS. 8 through 10, the suspension unit 220 is a rigid hanger that includes an upper portion 222 defining a handle 222A for transporting the suspension unit 220, a central portion 224 defining a downward-facing horizontal channel 224B, and a lower portion 226 beneath the central portion 224. As with the suspension unit 120 of FIGS. 5 through 7, the upper, central, and lower portions 222, 224, and 226 of the suspension unit 220 are each rigid and rigidly adjoin each other, such that the unit 220 as a whole is rigid. The unit 220 is shown as further having clasps 228 that are secured to the lower portion 226 and are preferably capable of coupling with the rings 16 of the belt 10 depicted in FIG. 2.

As more readily evident from FIG. 9, the channel 224B is formed by four wall portions 232, 233, 234, and 235 of the central portion 224, with an opening 236 between two of the wall portions 234 and 235 through which a rigid or nonrigid load-bearing member 52 (for example, a step or rung 52 of the ladder 50 in FIG. 10) is able to pass. The channel 224B is configured in size and shape to accommodate such a load-bearing member 52, thereby providing a similar function as the carabiners 24 of FIG. 1. As with the embodiment of FIGS. 5 through 7, the wall portions 232, 233, 234, and 235 may be referred to as rear, upper, lower, and front wall portions, respectively. As shown in FIG. 9, the rear, upper, and front wall portions 232, 233, and 235 can be formed by one continuous unitary member to define the channel 224B, and the lower wall portion 234 can be rigidly secured to the wall portion 232 without requiring the end wall portions 137 of FIGS. 5 through 7. The opening 236 is opposite the rear wall portion 232 and defined by and between the lower and front wall portions 234 and 235. The front wall portion 235 extends downward from the upper wall portion 233 toward a flange 234A that extends upward from the lower wall portion 234. The distance between the front wall portion 235 and the flange 234A of the lower wall portion 234 defines the width of the opening 236, and the distance between the front wall portion 235 and the rear wall portion 232 defines the depth of the channel 224B into which a load-bearing member 52 is receivable. The front wall portion 235 inhibits a load-bearing member 52 from escaping the channel 224B, thereby securing the suspension unit 220 to the load-bearing member 52 once placed on the load-bearing member 52 so that the suspension unit 120 securely hangs from and is retained on the load-bearing member 52.

The rear wall portion 232, the lower wall portion 234, and the flange 234A of the lower wall portion 234 define an upward-facing second channel 224C located below the downward-facing channel 224B such that the channel 224C is closer to the lower portion 226 than to the upper portion 222, whereas the channel 224B is closer to the upper portion 222 than to the lower portion 226. FIG. 9 shows entrances 238 and 240 to the channels 224B and 224C, respectively, as facing each other, and the opening 236 is between the channels 224B and 224C and their entrances 238 and 240. The upward-facing channel 224C can be utilized to capture a handle 44 of a container (bucket) 40 as shown in FIG. 10, thereby omitting the need for the belt 10 and allowing the container 40 to be suspended directly from the suspension unit 220. As seen in FIGS. 8 and 10, the lower wall portion 234 can have an arcuate shape extending across at least a portion of the width of the suspension unit 220, such that the lower wall portion 234 defines a curved support surface 234B within the channel 224C that is complementary in shape to the curved handle 44 of the container 40.

The lower portion 226 of the suspension unit 220 extends downward from the central portion 224 and provides means, such as rings 217, for securing the clasps 228 to the suspension unit 220. As in the previous embodiments of the invention, the clasps 228 can be utilized to engage the rings 16 of the belt 10, thereby allowing the belt 10 to be suspended from the rigid suspension unit 220. Alternatively, the clasps 228 can be utilized to capture the handle of the container 40 in FIG. 10, thereby omitting the need for the belt 10 and allowing the container 40 to be suspended directly from the suspension unit 220.

The embodiments depicted in the drawings provide exemplary examples, but particulars of the embodiments are not necessarily limiting. Various modifications to the belt 10 and the suspension units 20, 120, and 220 are possible. Some of their subcomponents can be fabricated as integral portions of a unitary body, or may be fabricated separately and bound together by any suitable manner. The rigid suspension units 120 and 220 depicted in FIGS. 5 through 10 may be predominantly composed of a rigid material, for example, wood or metal, the suspension units 120 and 220 could be fabricated from plastic or some other rigid or semi-rigid material, provided that the suspension units 120 and 220 are able to securely engage a load-bearing member 52 (e.g., a step or rung of a ladder) and have the structural strength to allow a container 40 and the belt 10 to hang therefrom.

According to another nonlimiting aspect of the invention, a method of using a suspension assembly 100 as described above includes securing a container 40 (e.g., a bucket or other receptacle) within the belt 10, suspending the belt 10 from the suspension unit 20, 120, or 220, and hanging the suspension unit 20, 120, or 220 from a rung or step of a ladder or another load-bearing member 52. Alternatively, a method of using a suspension assembly 100 as described above may involve hanging the suspension unit 20, 120, or 220 from a rung or step of a ladder or another load-bearing member 52, and then suspending a container 40 (e.g., a bucket or other receptacle) from the suspension unit 20, 120, or 220 by coupling a handle 44 of the container 40 to the clasps 228, 128, or 228 of the unit 20, 120, or 220 or coupling a handle 44 of the container 40 to the upward-facing channel 224C of the unit 220.

Further, another method made possible with the invention includes securing the circular strap 12 of the belt 10 to a container 40 by placing the container 40 within the central opening 13 of the circular strap 12 and sliding the circular strap 12 upwards around the container 40 until its upward movement is arrested, engaging the clasps 28, 128, or 228 of the suspension unit 20, 120, or 220 such that the belt 10 is suspended from the suspension unit 20, 120, or 220, engaging the suspension unit 20, 120, or 220 with a load-bearing member 52 such that the container 40, belt 10, and suspension unit 20, 120, or 220 are all suspended from the load-bearing member 52, and accessing contents of the container 40.

As previously noted above, though the foregoing detailed description describes certain aspects of one or more particular embodiments of the invention, alternatives could be adopted by one skilled in the art. For example, the suspension assembly 100 and its components could differ in appearance and construction from the embodiments described herein and shown in the drawings, functions of certain components of the suspension assembly 100 could be performed by components of different construction but capable of a similar (though not necessarily equivalent) function, and various materials could be used in the fabrication of the suspension assembly 100 and/or its components. As such, and again as was previously noted, it should be understood that the invention is not necessarily limited to any particular embodiment described herein or illustrated in the drawings.

The invention claimed is:

1. A suspension assembly for suspending a container from a load-bearing member, the suspension assembly comprising:

a suspension unit having a lateral width and comprising an upper portion, a lower portion, and a central portion therebetween;

the central portion comprising a rear wall portion, an upper wall portion extending from the rear wall portion in a forward direction of the suspension unit, a lower wall portion extending from the rear wall portion in the forward direction of the suspension unit, and a front wall portion spaced apart from the rear wall portion in the forward direction of the suspension unit and extending from the upper wall portion in a downward direction of the suspension unit;

the central portion having a first channel closer to the upper portion than to the lower portion, the first channel being defined by and between the rear, upper, and front wall portions, the first channel being disposed in the forward direction from the rear wall portion, facing in a downward direction of the suspension unit, and being configured to receive the load-bearing member through an opening in the central portion and through an entrance to the first channel defined by and between the rear and front wall portions, the first channel having a length spanning the lateral width of the suspension unit that is greater than a width of the entrance to the first channel in the forward direction of the suspension unit;

the central portion having a second channel that is closer to the lower portion than to the upper portion, the second channel being defined by and between the rear and lower wall portions, the second channel facing upward and being configured to receive a portion of the container through the opening in the central portion and through an entrance to the second channel defined by and between the rear and lower wall portions, the second channel having a length spanning the lateral width of the suspension unit that is greater than a width of the entrance to the second channel in the forward direction of the suspension unit; and clasps disposed on the lower portion;

wherein the entrances of the first and second channels face each other, the width of the entrance to the first channel is greater than the width of the entrance to the second channel, and the opening is between the first and second channels and the entrances thereof.

2. A method of securing the container from a load-bearing member of a ladder using the suspension assembly of claim 1, the method comprising:

securing the container to the suspension unit with the clasps;

inserting the load-bearing member through the opening of the central portion to thereby suspend the suspension unit from the load-bearing member; and positioning the load-bearing member within the first channel of the central portion such that the container is suspended from the load-bearing member by the suspension unit.

3. The method of claim 2, wherein the container is a bucket.

4. The method of claim 2, wherein the load-bearing member is a rung of a ladder.

5. The suspension assembly of claim 1, wherein the upper portion, the lower portion, and the central portion of the suspension unit are each rigid and rigidly adjoin each other.

6. The suspension assembly of claim 5, wherein the rear, front, upper, and lower wall portions define an approximately C-shaped cross section.

7. The suspension assembly of claim 1, wherein at least the rear, upper, and front wall portions are formed by one continuous rigid unitary member.

8. The suspension assembly of claim 7, wherein the lower wall portion has an arcuate shape extending across at least a portion of the lateral width of the suspension unit such that the lower wall portion defines a curved support surface within the second channel.

9. The suspension assembly of claim 1, wherein the clasps are disposed on the lower portion of the suspension unit beneath the second channel.

10. A suspension assembly for suspending a container from a load-bearing member, the suspension assembly comprising:

a suspension unit having a lateral width and comprising an upper portion, a lower portion, and a central portion therebetween;

the central portion comprising a rear wall portion, an upper wall portion extending from the rear wall portion in a forward direction of the suspension unit, a lower wall portion extending from the rear wall portion in the forward direction of the suspension unit, and a front wall portion spaced apart from the rear wall portion in the forward direction of the suspension unit and extending from the upper wall portion in a downward direction of the suspension unit;

the central portion having a first channel closer to the upper portion than to the lower portion, the first channel being defined by and between the rear, upper, and front wall portions, the first channel being disposed in the forward direction from the rear wall portion, facing in a downward direction of the suspension unit, and being configured to receive the load-bearing member through an opening in the central portion and through an entrance to the first channel defined by and between the rear and front wall portions, the first channel having a length spanning the lateral width of the suspension unit that is greater than a width of the entrance to the first channel in the forward direction of the suspension unit; and the central portion having a second channel that is closer to the lower portion than to the upper portion, the second channel being defined by and between the rear and lower wall portions, the second channel facing upward and being configured to receive a portion of the container through the opening in the central portion and through an entrance to the second channel defined by and between the rear and lower wall portions, the second channel having a length spanning the lateral width of the suspension unit that is greater than a width of the entrance to the second channel in the forward direction of the suspension unit;

wherein the entrances of the first and second channels face each other, the width of the entrance to the first channel is greater than the width of the entrance to the second channel, and the opening is between the first and second channels and the entrances thereof; and wherein the upper portion, the lower portion, and the central portion of the suspension unit are each rigid and rigidly adjoin each other; and wherein the rear, front, upper, and lower wall portions define an approximately C-shaped cross section; and wherein the upper portion of the suspension unit defines a handle adjoining the upper wall portion of the central portion.

11. The suspension assembly of claim 1, wherein the upper portion of the suspension unit defines a handle.

* * * * *